US006590982B1

(12) United States Patent
Chen

(10) Patent No.: US 6,590,982 B1
(45) Date of Patent: Jul. 8, 2003

(54) WIRELESS STEREO CENTER SPEAKER SYSTEM

(76) Inventor: Jinsaun Chen, 2nd Floor, No. 8 & 10, Lane 337, Yung Ho Road, Chung Ho City, Taipei (TW)

( * ) Notice: Subject to any disclaimer, the term of this patent is extended or adjusted under 35 U.S.C. 154(b) by 0 days.

(21) Appl. No.: 09/137,705
(22) Filed: Aug. 21, 1998
(51) Int. Cl.[7] .......................... H04H 5/00; H04H 7/00; H04B 5/00
(52) U.S. Cl. .............................. 381/2; 381/79; 381/80; 381/27; 455/3.06
(58) Field of Search ............................... 381/1, 74, 79, 381/27, 120, 80, 82, 85, 2, 14, 3, 16; 455/3.01, 3.06

(56) References Cited

U.S. PATENT DOCUMENTS 5,722,050 A * 2/1998 Chen .......................... 455/66
5,768,399 A * 6/1998 Statham et al. ............ 381/120
6,118,876 A * 9/2000 Ruzicka ...................... 381/18

* cited by examiner

*Primary Examiner*—Forester W. Isen
*Assistant Examiner*—Brian Pendleton

(74) *Attorney, Agent, or Firm*—Donald C. Casey, Esq.

(57) ABSTRACT

A Wireless Concealed Transmitter Stereo Center Speaker System includes a concealed transmitter unit installed a center speaker, and two receiver units installed in two rear speakers, wherein the concealed transmitter unit includes an automatic audio level regulating circuit to regulate the audio level of the output signal of audio equipment to a predetermined range, a power control circuit controlled by the output signal of the audio equipment to provide the necessary working voltage, and an inductance antenna to transmit stable output signal from the audio equipment to the receiver units of rear speakers; the receiver units are of low working voltage design, including an automatic 24-time frequency divider circuit to effectively discriminate left and right sound tracks, and an auto-shut off circuit to automatically cut off power supply from either an alternating current source or battery power supply when the audio equipment does not work; the concealed transmitter unit and the receiver units further use a respective external and internal dual adjustable oscillatory frequency regulating circuit consisting of an oscillatory transistor, a dielectric resonator, and a variable capacitor and a variable capacitor diode for regulating a broader range of the frequency and allowing users/consumers to adjust the first local oscillation through "external frequency controller VRI" without changing the second local oscillation.

47 Claims, 4 Drawing Sheets

WIRELESS STEREO CENTER SPEAKER SYSTEM

BACKGROUND OF THE INVENTION

The present invention relates to a concealed transmitter unit and receiver units in speakers to be used in a stereo audio equipment which comprises a concealed transmitter unit installed in a center speaker to transmit audio signal, and two receiver units installed in two rear speakers to receive transmitted signals from the concealed transmitter center speaker. The present invention system uses wireless technology to transmit audio signal to the receiving speakers in order to eliminate the limitation and inconvenience of external electrical devices thus further elevates the maximum performance and application of an audio equipment.

The ideas of the present invention was generated from the popular use of home theater set and stereo audio equipment. The conventional stereo audio equipment usually comprises of one stereo surround processing amplifier, two left and right sound track center speakers, one center low bass speaker and two left and right sound tract rear speakers together to provide sound effects like that of cinema house or theater. However, to install a set of conventional stereo audio equipment, a lot of external complicated electrical devices is required to connect all speakers to the main sound source or player. Sometimes the length of electrical devices limits users to think where and how the audio equipment can be perfectly allocated so to suit the family internal concept and gives its best performance. Moreover, the exposed electrical devices creates burden on maintenance and cleanness. If to keep the electric wires from sight, the installation cost of the audio equipment will be high. The biggest problem with conventional wired audio equipment is that it confines users to a particular place where the equipment is located in order to listen to the music of the equipment. However, when users leave the place and still want the sound of equipment to be heard, it is necessary to turn the volume louder. Situations like this may therefore cause interference and disturbance to others.

OBJECTIVES AND SUMMARY OF THE INVENTION

The present invention has been accomplished to provide a wireless concealed transmitter stereo center speaker system which eliminates the aforesaid problems. It is one object of the present invention to provide a wireless concealed transmitter and receivers installed in the center and rear speakers so that sound signal of the audio player can be transmitted to the rear speakers for output wirelessly. It is another object of the present invention to provide a wireless concealed transmitter and receivers in center and rear speakers which can be installed everywhere easily without the limitation and confinement of electrical devices. It also gives users the freedom to adjust the volume of any individual speaker, so that the users can listen to the music of the audio equipment without interfering other persons. It is still another object of the present invention to provide a wireless concealed transmitter stereo center speaker system which eliminates the use of complicated matching devices by using an inductance type transmitting antenna which reduces the floating of frequency so to provide stable audio signal and not to be interfered by walls, glasses, ceilings or pillars. It is still another object of the present invention to provide a wireless concealed transmitter stereo center speaker system which consumes low working voltage. It is still another object of the present invention to provide a wireless concealed transmitter stereo center speaker system which automatically cuts off external alternating or battery power supply when the audio equipment does not work, so that it is very energy saving. It is still another object of the present invention to provide a wireless concealed transmitter stereo center speaker system which adopts an external and internal dual adjustable oscillatory frequency regulating circuit for the transmitter unit as well as the receiver units so that the range of the frequency can be broadly adjusted. It is still another object of the present invention which provides an adjustable "external frequency controller VR1" to enable the users (consumers) to change the frequency of the first local oscillation and broaden the frequency range. It is necessary to elaborate the mechanism of the "Frequency Controller VR1" in the present invention. In the external and internal dual adjustable oscillatory frequency regulating circuit the Frequency Controller VR1 is used as a potential divider. The moment users turn the tuner to adjust the Frequency Controller VR1 the center output electrical level fluctuates and varies with the adjusting of the tuner. The VCO (variable capacitor diode) is being controlled by R31 and R5, hence they induce the DR to vary its oscillation meanwhile Q1 also varies its oscillatory frequency. The Frequency Controller VR1 is capable of controlling the VCO variant range approximately from +/−0.5 MHz to +/−2 MHz. Internally, technicians can control the VCA and VCB to broaden frequency range to +/−3 MHz. Therefore the capacity of transmitting frequency variation is far better than the conventional use of SAW. Meanwhile technicians can also replace VCA and VCB to fixed capacitors in order to fix the frequency. On the other hand, in the receiver unit the Frequency Controller VR1 is used as a potential divider as well. When users turn the tuner to adjust the Frequency controller VR1, the center electrical level output varies. Now the VCD is being controlled by R11 and R10 to induce the DR varies its oscillation and further results in the oscillatory frequency of Q1. In this way the Frequency Controller VR1 is capable of controlling VCO's variation approximately from +/−0.5 MHz to +/−3 MHz. Likewise, technicians can broaden the frequency range by controlling the VCA and VCB to approximately +/−5 MHz or more. Hence the capacity of receiving frequency variation is better than that of using a SAW method. Meanwhile the first local oscillation in the VCO is approximately 1003 MHz after mixing with external transmitting frequency (eg. 912 MHz) the resulting first IF is about 91 MHz. Please refer to FIGS. 1 and 2. Technicians can also replace the VCA and VCB to fixed capacitors if a fixed first down-convert is desired.

According to the preferred embodiment of the present invention, the concealed transmitter unit in the center speaker comprises an automatic audio level regulating circuit to regulate the audio level of the output signal of an audio equipment to a predetermined range, a power control circuit controlled by the output signal of the audio equipment to provide the necessary working voltage, and an inductance antenna to transmit output signal from the concealed transmitter center speaker to the receiver units of rear speakers. The receiver unit comprises an automatic 24-time frequency divider circuit to effectively discriminate left and right sound tracks, and an auto-shut off circuit to automatically cut off power supply from either external alternating current source or battery supply when the audio equipment does not work. Furthermore, the transmitter unit and the receiver unit further use a respective (external and internal) dual adjustable oscillatory frequency regulating circuit consisting of an oscillatory transistor, a dielectric resonator, and a variable capacitor and a variable capacitor diode for regulating the range of the frequency.

DETAILED DESCRIPTION OF THE PREFERRED EMBODIMENT

Figure 1:
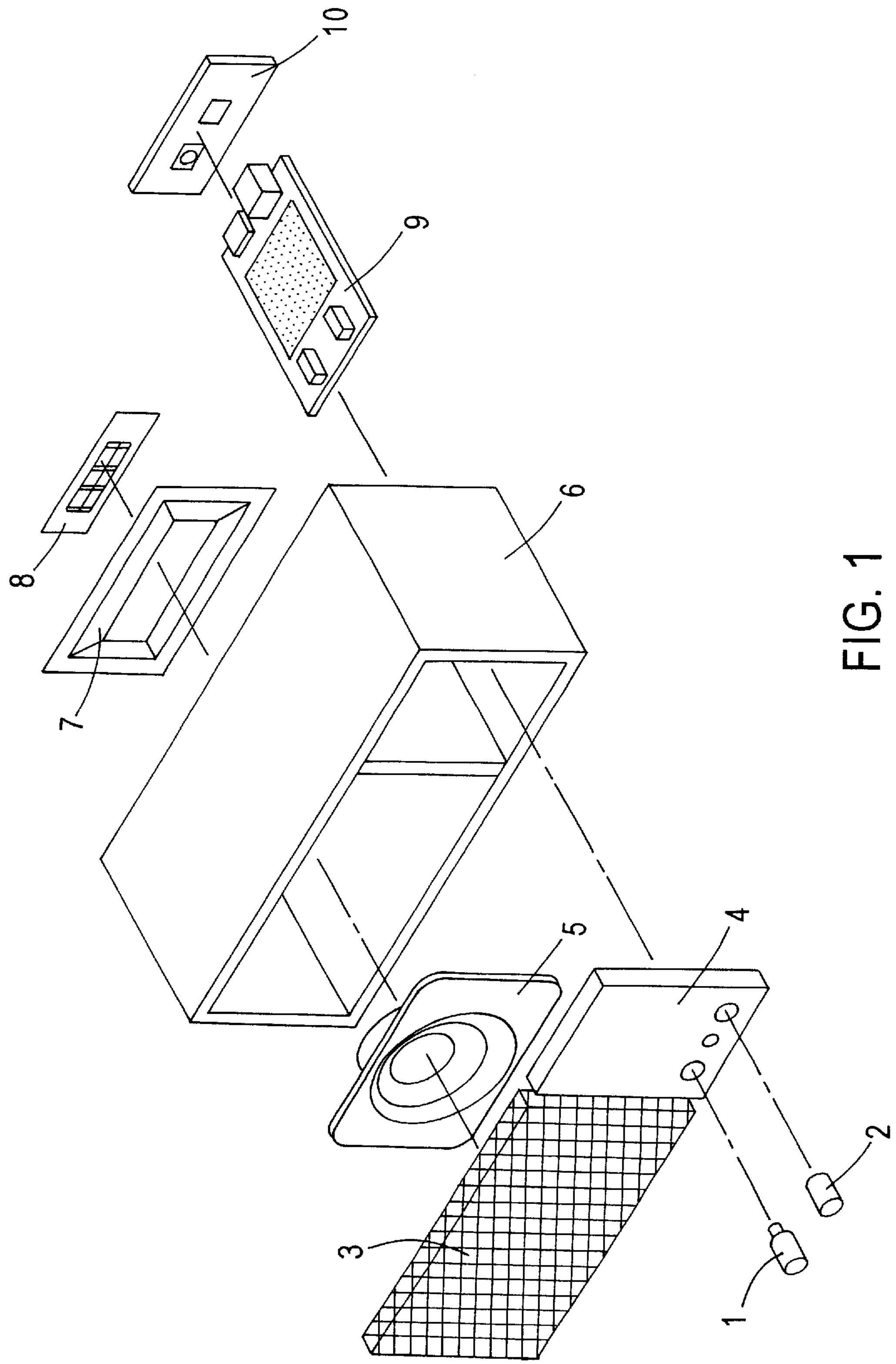
FIG. 1 is a prospective diagram of the Wireless Concealed Transmitter Stereo Center Speaker System.

A wireless concealed transmitter stereo center speaker system in accordance with the present invention is comprised of a concealed transmitter unit installed in the mainframe of a center speaker, and two receiver units installed in two rear speakers. FIG. 1 shows the prospective diagram of the wireless concealed transmitter center speaker.

Figure 2:
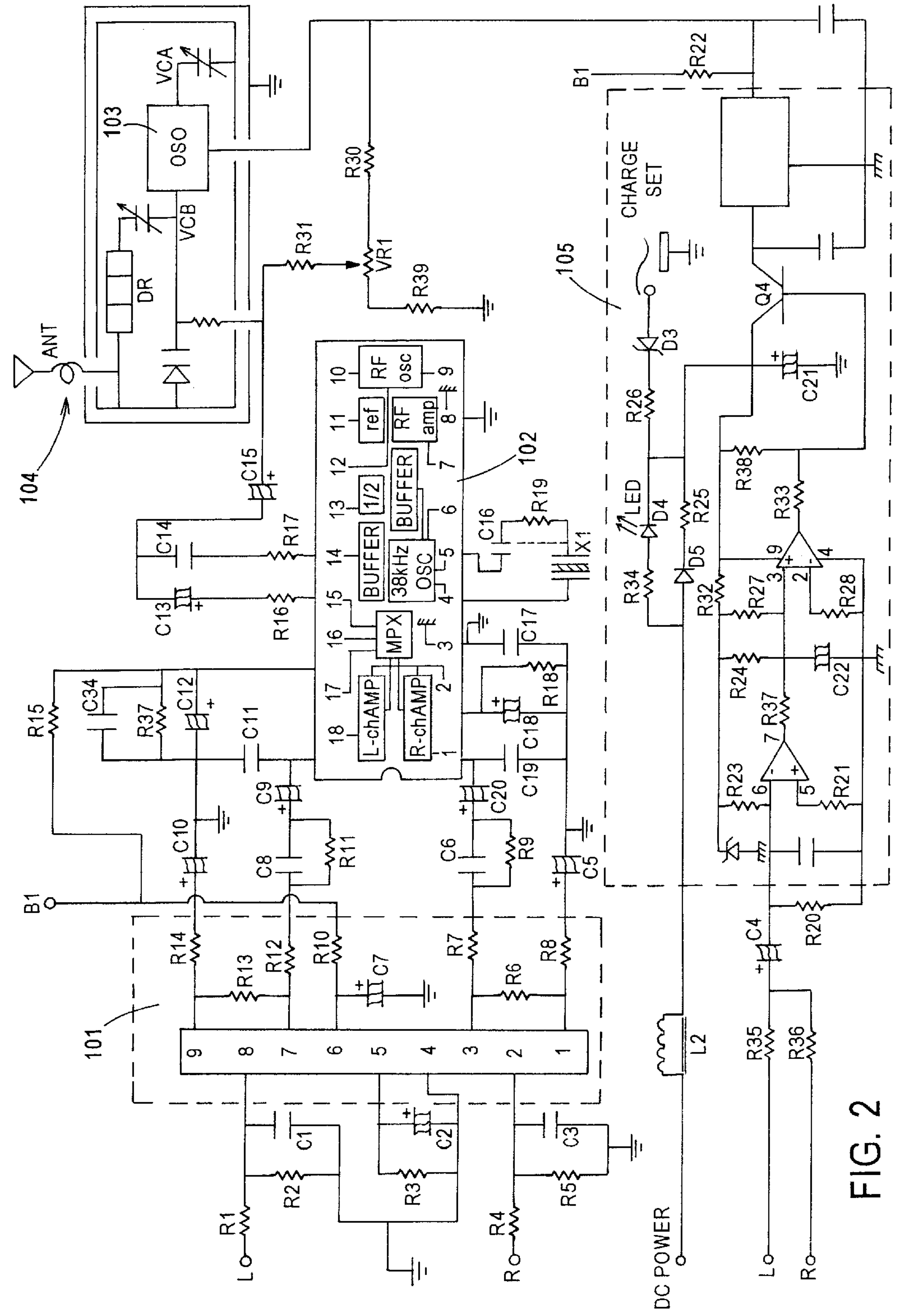
FIG. 2 is a circuit diagram of the concealed transmitter unit of the Wireless Stereo Center Speaker System.
Figure 3:
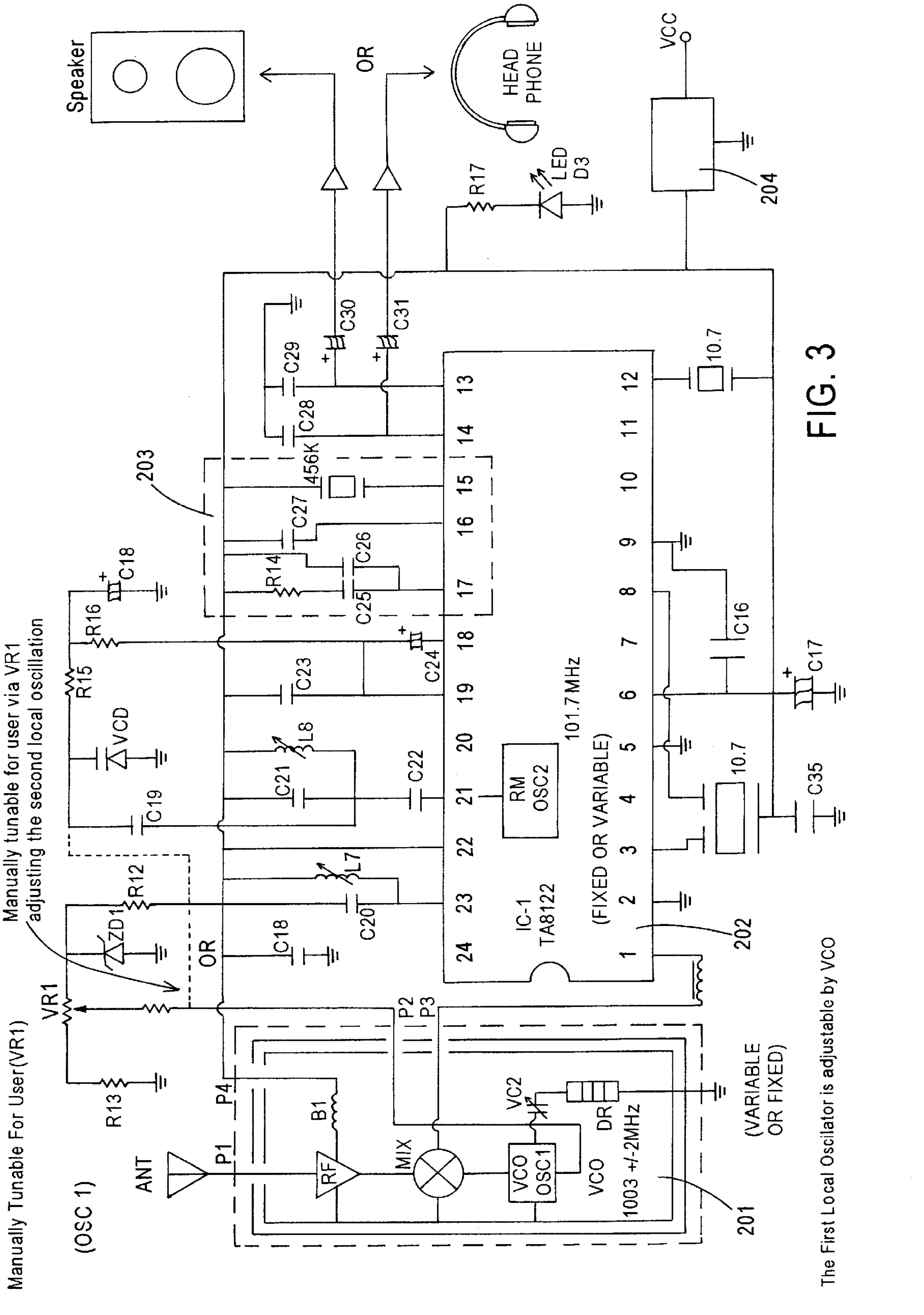
FIG. 3 is a circuit diagram of the receiver unit of the Wireless Stereo Rear Speaker.
Figure 4:
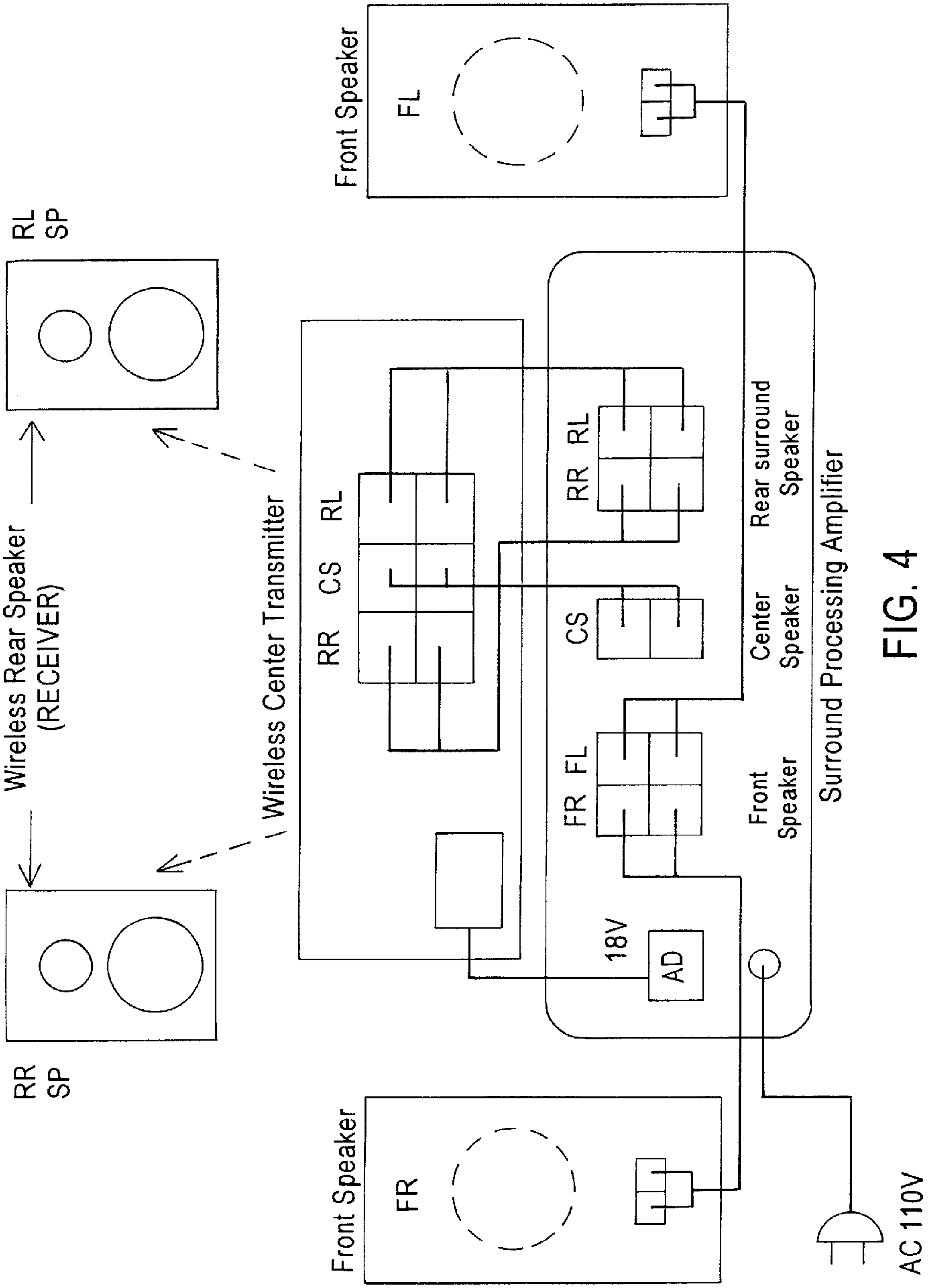
FIG. 4 is a block diagram of the Wireless Concealed Transmitter Stereo Center Speaker System.

FIG. 2 shows the circuit of the wireless concealed transmitter unit. FIG. 3 shows the circuit of the receiver unit. FIG. 4 shows the block diagram of the wireless concealed transmitter stereo center speaker.

Referring to FIG. 1, the center speaker external is framed by a speaker cabinet 6, a speaker 5 is installed in one side and a transmitter PCB 9 is built-in in the other side. The speaker 5 is covered and protected by a net 3. The speaker cabinet 6 has a rear cover on which a speaker base 7 and a terminal 8 are installed and fixed on by screws. In front of the transmitter PCB 9, a front cover 4 is used on which a tuning knob 1 and a power switch 2 are connected through the front cover 4 to the transmitter PCB 9. The tuning knob is connected to the "External Frequency Controller VR1" by turning the tuning knob users can tune to the most satisfied condition.

Referring to FIG. 2, the automatic audio level regulating circuit, referenced by 101, is comprised of an audio level regulating integrated circuit.

When the output signal of the left and right sound tracks of the audio equipment is received, it is transmitted to the input terminal of the audio level regulating circuit, which regulates the audio level of the signal to a standard level and then sends the regulated signal to a posterior signal processing circuit 102. As the signal processing circuit processes the sound source, its output terminal connects to the (external and internal) dual adjustable oscillatory frequency regulating circuit, referenced by 103, is comprised of an oscillating transistor OSC, a dielectric resonator DR, and two variable capacitors VCA, VCB to provide approximately 27 MHz to 2.4 GHz or more. The input terminal of the external and internal dual adjustable oscillatory frequency regulating circuit 103 is connected to the output terminal of the aforesaid signal processing circuit, and the output terminal is connected to the inductance antenna, referenced by 104. The inductance antenna 104 itself is a matching device producing stable audio signal, therefore no external matching devices are needed. The power control circuit, referenced by 105, is comprised of a signal amplifier, a comparator and a transistor. When the comparator of the power control circuit 105 receives a signal, the signal amplifier drives on the comparator and switches on the transistor hence permitting external power supply to be connected to the transmitter unit to provide it with the necessary working voltage. When the signal amplifier of the power control circuit 105 receives no signal, it immediately turns off the transistor.

Referring to FIG. 3, the receiver unit installed in the rear speaker comprises an external and internal dual adjustable oscillatory frequency regulating circuit 201 that enable users/consumers to adjust the first down-converter via "external frequency controller VR1" by turning the tuning knob. The structure of the input terminal of the external and internal dual adjustable oscillatory frequency regulating circuit is identical to that of transmitter unit. The external and internal dual adjustable oscillatory frequency regulating circuit 201 produces first intermediate frequency within the range approximately from 10 MHz to 230 MHz or more.

The input terminal of the external and internal dual oscillatory frequency regulating circuit is connected to the signal processing circuit 202, and the output terminal thereof is connected to the receiving antenna of the receiver unit. The signal processing circuit 202 of the receiver unit is comprised of an integrated circuit IC-1. The 24 time frequency divider circuit, referenced by 203, is comprised of a resistor R14, capacitors C25, C26, C27, C28, C29. And an oscillator, and connected to the signal processing circuit IC-1 to divided the frequency of the output signal of the signal processing circuit IC-1 by 24, so as to provide a 19 KHz three-dimensional demodulated signal of better left, right sound track discrimination. When the output signal of the signal processing circuit is amplified, it is provided to the speaker or earphone. The auto-shut off circuit 204 is comprised of an integrated circuit IC-2 and a transistor Q5. The transistor Q5 is controlled by the integrated circuit IC-2 to turn on/off external power supply or battery supply. The integrated circuit IC-2 can automatically cut off power supply after a predetermined length of time so as to achieve energy saving. The working voltage of the receiver unit is designed at a level about 2.1–3.5 V so that battery power consumption can be minimized.

The present invention of both concealed transmitter unit and receiver unit are equipped respectively with an external and internal dual adjustable oscillatory frequency regulating circuit 103, 201 that help to adjust a broader frequency range and produce the output of the first intermediate frequency within the range approximately from 10 MHz to 230 MHz or more. Users or consumers can access to the external dual adjustable oscillatory frequency regulating circuit by turning the tuning knob to adjust broader frequency range and band while the internal one is accessible to technical personnel. It is critical that when the first local oscillatory frequency is at approximately 1 GHz, it is almost 10 to 20 times more than the second local oscillatory frequency; users can adjust "frequency control VR1" without getting any unnecessary false frequency and interference. The "frequency control VR1" can be said as the most essential feature in the present invention. It is also a break through in wireless audio system. This method differs from the conventional method of installation of a SAW which limits the first local oscillation to be fixed and users need to adjust the second local oscillation.

Referring to FIG. 4, the mechanism of the present invention goes from the surround processing amplifier which processes audio signal from a sound source; transmitting the left, right sound tracks, center speaker signal and rear speaker left and right sound tracks output signal to their respective terminals. Wherein the center speaker left, right sound tracks output signal are directly connected to their terminals, whereas the center speaker and rear speaker left and right sound tracks output signal are transmitted wirelessly by the concealed transmitter unit in the center speaker to the receiver unit in the rear speakers. This mechanism offers users to locate rear speakers anywhere within the receiving range without the limitation and confinement of electrical devices. Users can also locate various rear speakers in different rooms within the defined receiving range.

It is to be understood that the drawings are designed for purposes of illustration only, and are not intended as a definition of the limits and scope of the invention disclosed.

What the invention claims is:

1. A wireless concealed transmitter center speaker system including a concealed transmitter unit installed in a center speaker cabinet, and two receiver units installed in two rear speaker cabinets, wherein:

said concealed transmitter unit comprises:

an automatic audio level regulating circuit comprising an audio regulating IC, having an input terminal connected to the output terminal of said audio equipment to regulate the audio level of the output signal of said audio equipment to a predetermined range to a signal processing circuit;

said signal processing circuit having an input terminal connected to the output terminal of said automatic audio level regulating circuit and output terminal connected to an external and internal dual adjustable oscillatory frequency regulating circuit;

said external and internal dual adjustable oscillatory frequency regulating circuit comprising an oscillator transistor, and dielectric resonator, a first variable capacitor and a second variable capacitor diode;

an inductance antenna connected to the output terminal of said external and to internal dual adjustable frequency regulating circuit, said inductance antenna being a matching device; and a power control circuit controlled by the output signal of said audio equipment to provide the necessary working voltage to said concealed transmitter unit, said power control circuit comprising a signal amplifier, a comparator and a transistor switch, when said signal amplifier receives an input signal from said audio equipment it drives on said comparator and transistor switch hence permitting external power supply or battery supply to be connected to said concealed transmitting unit.

2. The invention of claim 1 wherein said transmitter unit is housed in said center speaker cabinet.

3. The invention of claim 1 wherein said automatic audio level regulating circuit comprises an electrical regulating IC, having an input terminal connected to the output terminal of said audio equipment to regulate the audio level of the output signal of said audio equipment to a predetermined range, and an output connecting to said signal processing circuit.

4. The invention of claim 1 wherein said signal processing circuit has an input terminal connected to the output terminal of said automatic electric level regulator, and an output terminal connected to said external and internal dual adjustable oscillatory frequency regulating circuit.

5. The invention of claim 1 wherein said signal processing circuit comprises a 3-dimensional signal multi-regulating circuit through which +/−19 KHz pilot signals can be regulated into any frequency such as +/−32 KHz, to +/−40 KHz, +/−62 KHz etc., and transmit to said external and internal dual adjustable oscillatory frequency circuit.

6. The invention of claim 1 wherein said external and internal dual adjustable oscillatory frequency regulating circuit comprises an oscillatory transistor, a dielectric resonator, a first variable capacitor and a second variable capacitor diode, having an input terminal connected to the output terminal of said signal processing circuit, and an output terminal connected to the receiving antenna, providing approximately 27 MHz to 2.4 GHz transmitting frequency signal.

7. The invention of claim 6 wherein said external and internal dual adjustable oscillatory frequency circuit comprises said first variable capacitor which is internally fixable by adding a quartz or SAW.

8. The invention of claim 6 wherein said in external and internal dual adjustable frequency regulating circuit the first variable capacitor is internally adjustable.

9. The invention of claim 6 wherein said second variable capacitor diode via frequency controller VR1 is externally adjustable.

10. The invention of claim 9 wherein said second variable capacitor diode of said external and internal dual adjustable oscillatory frequency regulating circuit can be altered into an infrared or wireless digital remote control system to adjust channel or frequency.

11. The invention of claim 1 wherein said second variable capacitor diode is a frequency controller VR1.

12. The invention of claim 6 wherein said external and internal dual adjustable oscillatory frequency regulating circuit's transmitting frequency can be read by a digital display to show the channel position.

13. The invention of claim 6 wherein said external and internal dual adjustable oscillatory frequency regulating circuit can be (a) variable resistors, (b) variable capacitor, (c) variable electrical sensor or a combination of (a)(a), (b)(b), (c)(c), (a)(b), (b)(c), (a)(c) coupled with a fixed electric resistor, electric capacitor, inductor, dielectric resonator, and transistor to make a transmitting oscillator.

14. The invention of claim 1 wherein said inductance antenna connected to the output terminal of said external and internal dual adjustable oscillatory frequency regulating circuit is a matching device.

15. The invention of claim 14 wherein said inductance antenna provides stable and non-floating wireless audio signals to the receiver unit.

16. The invention of claim 1 wherein said power control circuit is controlled by the output signal of said audio equipment to provide the necessary working voltage to said concealed transmitter unit.

17. The invention of claim 16 wherein said power control circuit comprises a signal amplifier, a comparator and a transistor switch said signal amplifier receiving an input signal from said audio equipment to drive said comparator and transistor switch permitting an external power supply or battery supply to be connected to said concealed transmitter unit.

18. The invention of claim 16 wherein said power control circuit has both automatic and manual control.

19. The invention of claim 1 wherein said concealed transmitter unit is capable of processing audio signal input into stereo sound effect and has at least one additional sound mixer system to be used as a microphone and transmitting mixing sound effect.

20. The invention of claim 1 wherein said transmitter unit is equipped with special noise blocking system for general usage as an independent transmitter directly connected to TV, CD player, automobile audio system or center speaker without noise or radiator interference.

21. The invention of claim 1 wherein said concealed transmitter unit can be used together with a plurality of receiving speakers simultaneously.

22. The invention of claim 1 wherein said receiver unit in the rear speaker comprises:

an external and internal dual adjustable oscillatory frequency regulating circuit comprising an oscillatory transistor, a dielectric resonator, and a variable capacitor and a variable capacitor diode, its down converted frequency being connected to a signal processing circuit, said signal processing circuit connected to said external and internal dual adjustable oscillatory frequency regulating circuit to process received signals and to provide processed signals to said unit, an automatic 24-time frequency divider circuit comprised of a resistor and an oscillator and connected to an IC of the signal processing circuit of said receiver unit to divide the frequency of the received signal by 24, so as to provide a 19 KHz three-dimensional demodulated signal, and an auto-shut off circuit comprised of said IC and a transistor, said transistor being controlled by said IC to turn on/off an external power supply or battery supply.

23. The invention of claim 22 wherein said external and internal dual adjustable oscillatory frequency regulating circuit comprises an oscillatory transistor, a dielectric resonator, a first variable capacitor and a second variable capacitor diode.

24. The invention of claim 22 wherein said external and internal dual adjustable oscillatory frequency regulating circuit has an input terminal connected to the output terminal of said receiving antenna, and an output terminal connected to said signal processing circuit.

25. The invention of claim 22 wherein said external and internal dual adjustable oscillatory frequency regulating circuit and external frequency controller VR1 enables users or consumers to adjust first a local oscillatory frequency externally in order to chose channels.

26. The invention of claim 22 wherein said external and internal dual adjustable oscillatory frequency regulating circuit has a first intermediate frequency output being within approximately 10 MHz to 230 MHz.

27. The invention of claim 22 wherein said external and internal dual adjustable oscillatory frequency regulating circuit provides a local oscillatory frequency to at least approximately 1000 MHz which is 10 to 20 times the second local oscillatory frequency (50 MHz~100 MHz).

28. The invention of claim 22 wherein in said external and internal dual adjustable oscillatory frequency regulating circuit said external frequency controller VR1 can be altered into an infrared or wireless digital automatic channel scanning system.

29. The invention of claim 22 wherein said external and internal dual adjustable oscillatory frequency regulating circuit is capable of adjusting frequency broadly, and to down-convert frequency from 10 MHz to 230 MHz.

30. The invention of claim 22 wherein said external and internal dual adjustable oscillatory frequency regulating circuit can input said FM and AM commercial band frequency signals to said signal processing circuit.

31. The invention of claim 22 wherein said signal processing circuit is connected to said external and internal dual adjustable oscillatory frequency regulating circuit.

32. The invention of claim 31 wherein said signal processing circuit can both detect and demodulate AM or FM audio stereo or mono audio signal from said transmitter unit.

33. The invention of claim 31 wherein said signal processing circuit can process FM or AM audio signal approximately within range of 10 MHz to 230 MHz.

34. The invention of claim 31 wherein said signal processing circuit within which the second local oscillation is internally adjustable or fixable by adding a quartz.

35. The invention of claim 31 wherein said signal processing circuit within which the second local oscillation is externally adjustable by users to switch channels.

36. The invention of claim 31 wherein said signal processing circuit can demodulate stereo audio signals and by 456 KHz ceramic resonator oscillating and 24-times frequency dividing provide exact high fidelity 19 KHz multi-demodulating signals.

37. The invention of claim 23 wherein said auto-shut off circuit is comprised of an integrate circuit and transistors.

38. The invention of claim 37 wherein said transistor of said auto-shut off circuit is controlled by the IC of said auto-shut off to automatically turn on/off an external power supply or battery power supply.

39. The invention of claim 37 wherein said auto-shut off circuit can automatically turn on said receiver unit when it receives audio signals and automatically turns off said receiver unit when it receives no audio signal.

40. The invention of claim 37 wherein said auto-shut off circuit can be turned on or turned off by manual control.

41. The invention of claim 23 wherein said receiver unit consists of integrate circuits and transistors.

42. The invention of claim 24 wherein said external and internal dual adjustable oscillatory frequency regulating circuit can be (a) variable resistor, (b) variable capacitor, (c) variable electrical sensor or above mentioned combination of (a) (a), (b) (b), (c) (c), (a) (b), (b) (c), (a) (c) coupled with fixed electric resistor, electric capacitor, inductor, dielectric resonator, transistor, mixer and IC to make a down-converter.

43. The invention of claim 23 wherein said receiver unit is housed in rear speaker cabinets.

44. The invention of claim 23 wherein the function, method and application of said receiver unit can be used in other types of wireless audio receivers, earphone and wireless microphones.

45. The invention of claim 23 wherein said receiver unit can output a surround audio effect after processing the original audio source without the additional mounting of a surround processor.

46. The invention of claim 23 wherein said receiver unit is capable to process sound mixing when additionally mounting a sound mixer.

47. The invention of claim 23 wherein said receiver unit is wireless so that it can be positioned or relocated from place to place by users.

* * * * *